United States Patent [19]

Buchar et al.

[11] Patent Number: 4,684,237

[45] Date of Patent: Aug. 4, 1987

[54] SCAN ASSEMBLY MOVED BETWEEN ALTERNATE POSITIONS TO PREVENT PLATEN OVERHEATING

[75] Inventors: Wayne A. Buchar, Holcomb; James P. Russell, Ontario, both of N.Y.

[73] Assignee: Xerox Coporation, Stamford, Conn.

[21] Appl. No.: 780,775

[22] Filed: Sep. 27, 1985

[51] Int. Cl.⁴ .................... G03G 15/28; G03G 21/00
[52] U.S. Cl. ......................................... 355/8; 355/30
[58] Field of Search ........................ 355/3 R, 8, 30, 75

[56] References Cited

U.S. PATENT DOCUMENTS

| | | | |
|---|---|---|---|
| 3,712,731 | 1/1973 | Shiina | 355/71 |
| 4,084,897 | 4/1978 | Queener | 355/8 |
| 4,098,552 | 7/1978 | Okukawa | 355/30 X |
| 4,143,964 | 3/1979 | Ogura et al. | 355/30 |
| 4,183,656 | 1/1980 | Ishihara et al. | 355/30 X |

FOREIGN PATENT DOCUMENTS 56-62269 5/1981 Japan.

Primary Examiner—Fred L. Braun

[57] ABSTRACT

A scanning system for an electrophotographic printing machine is adapted to alleviate the problem of platen overheating when the machine is operated in a mode wherein documents are stream-fed past an exposure zone formed by a stationary scan/illumination assembly. The scanning system includes a scan/illumination assembly which moves beneath a stationary platen during a first, copying mode. When the mode of operation changes and the documents are stream-fed along the platen surface, the illumination/scan assembly is held stationary during each exposure cycle but is periodically moved to new positions during subsequent exposure cycles. A system controller monitors the stream-fed mode of operation and adjusts system timing and registration functions to compensate for the alternate scan/illumination exposure positions.

4 Claims, 4 Drawing Figures

SCAN ASSEMBLY MOVED BETWEEN ALTERNATE POSITIONS TO PREVENT PLATEN OVERHEATING

This invention relates to an electrophotographic document reproduction machine and more particularly to a document illumination and scanning system which is adapted for use in a first, stationary, document mode of operation and for a second mode of operation wherein the document is transported across the surface of the stationary platen at a speed synchronous with the photoreceptor travel.

In electrophotographic devices, such as a xerographic copier or printer, a photoconductive surface is charged to a substantially uniform potential. The charged portion of the photoconductive surface, typically a photoreceptor drum or belt, is exposed to a light image of an original document being reproduced, forming an electrostatic latent image at the photoconductive surface corresponding to the informational areas contained within the original document. The electrostatic latent image is subsequently developed by bringing a developer mixture into contact therewith. The developed image is subsequently transferred to an output copy sheet. The powder image on the output sheet is then heated to permanently affix it to the sheet in the image configuration.

The optical system for exposing the document and projecting an image onto the photoconductive surface typically takes one of two forms; either a scanning or a flash mechanism. This invention is concerned with an optical scanning system which provides a conventional document scan and illumination system for scanning a stationary document positioned on a stationary platen, the scanning system adapted to operate in a second mode consistent with implementation of a controlled velocity transport (CVT) mode of operation. In this mode, a document or, more typically, a plurality of documents, are stream-fed along the surface of a document platen past an exposure zone. The scanning components, which had been movable in the first scan mode, are now required to be held in a stationary position during the time the document is moving through the exposure zone. The location of an incrementally illuminated portion of the platen defines the exposure zone.

One problem with operation in a CVT mode is that for extended document runs the intense illumination directed at the same longitudinal area of the platen causes over-heating of the glass, possibly resulting in shattering or fracture of the glass. The invention is therefore directed to a means for reducing the risk of platen damage when operating a scanning system in a CVT mode. More particularly, the invention is directed towards an electrophotographic document reproduction apparatus wherein documents are transported across the surface of a transparent support surface, an imaging and control system for forming a latent image of the document at a moving photoreceptor surface, the imaging and control system including:

means for scan/illuminating an incremental strip of said support surface,
a lens for projecting reflected images of said incrementally scanned document onto said photoreceptor surface to form a latent image of the document thereon,
means for moving said scan/illumination means between at least two positions beneath the support surface during a copying scan, and
control means adapted to control the operation of said scan/illumination means so as to periodically and sequentially move said means to the alternate position.

Other aspects of the invention will become apparent as the following description proceeds and upon reference to the drawings in which.

Figure 1:
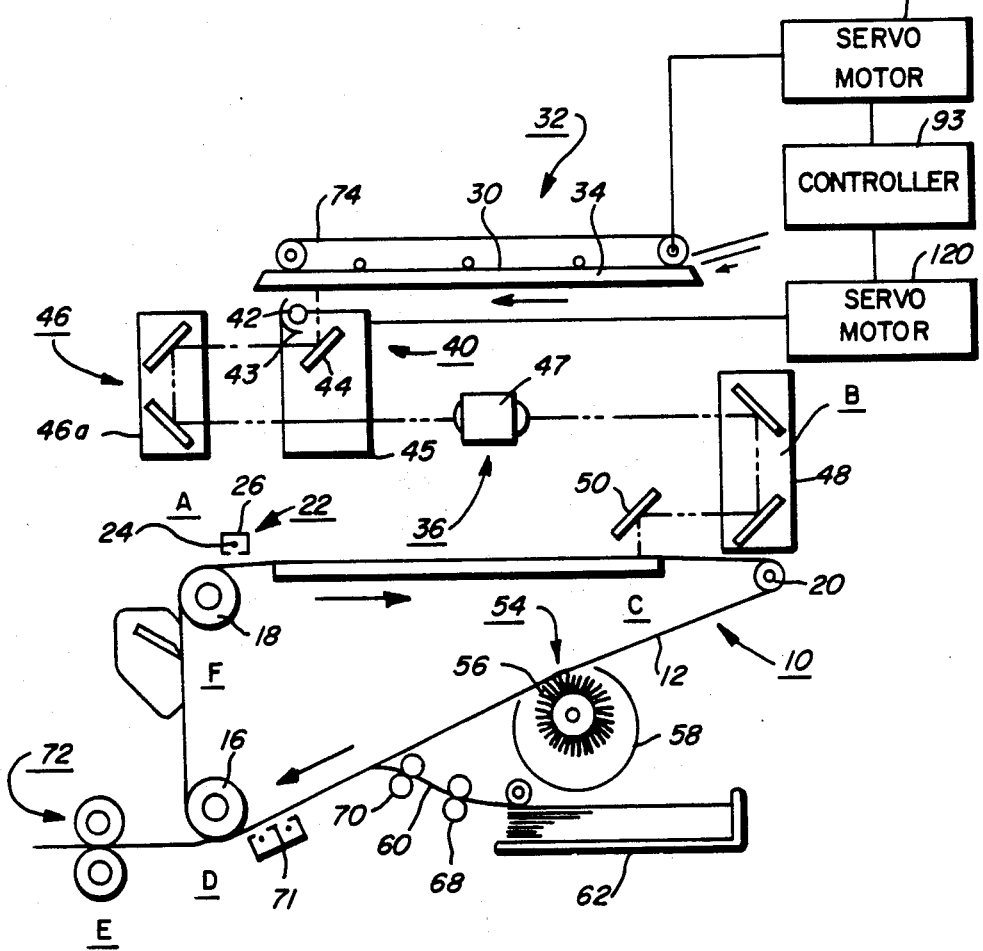
FIG. 1 is a side schematic view of an electrophotographic printing machine incorporating the features of the present invention.

For a general understanding of the features of the present invention, reference is made to the drawings. FIG. 1 schematically depicts the various components of an illustrative electrophotographic printing machine incorporating the optical scanning system of the present invention therein. It will become apparent from the following discussion that this optical system is equally well suited for use in a wide variety of electrophotographic printing machines and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto. The operational mode firstly described is the conventional fixed document, moving optics mode. The moving document fixed optics (CVT) mode is taken up subsequently.

Turning now to FIG. 1, the electrophotographic printing machine uses a photoreceptor belt 10 having a photoconductive surface 12 formed on a conductive substrate. Belt 10 moves in the indicated direction, advancing sequentially through the various xerographic process stations. The belt is entrained about drive roller 16 and tension rollers 18, 20. Roller 18 is driven by conventional motor means, not shown.

With continued reference to FIG. 1, a portion of belt 10 passes through charging station A where a corona generating device, indicated generally by the reference numeral 22, charges photoconductive surface 12 to a relatively high, substantially uniform, negative potential. Device 22 comprises a charging electrode 24 and a conductive shield 26.

As belt 10 continues to advance, the charged portion of surface 12 moves into exposure station B. An original document 30 is positioned, either manually, or by a document feeder mechanism 32 to be described in further detail below, on the surface of a transparent platen 34. Optics assembly 36 contains the optical components which, in the fixed document mode, incrementally scan-illuminate the document from left to right and project a reflected image onto surface 12 of belt 10. Shown schematically, these optical components comprise an illumination scan assembly 40, comprising illumination lamp 42, associated reflector 43 and full rate scan mirror 44, all three components mounted on a scan carriage 45. The carriage ends are adapted to ride along guide rails (not shown) so as to travel along a path parallel to and beneath, the platen. Lamp 42 illuminates an incremental line portion of document 30. The reflected image is reflected by scan mirror 44 to corner mirror assembly 46 on a second scan carriage 46A, mechanically connected to carriage 45 and adapted to move at ½ the rate of carriage 45. The document image is projected through lens 47 and reflected by a second corner mirror 48 and belt mirror 50, both moving at a predetermined relationship so as to precess the projected image, while maintaining the required rear conjugate, onto surface 12 to form thereon an electrostatic latent image corresponding to the informational areas contained within original document 32. The optics assembly 36, besides operating in a scanning mode, also provides the illumination for a document which is moved across the surface of platen 34 by document feeder mechanism 32 in a CVT mode. During this CVT mode, the position of the scan components is periodically displaced so as to change the location of the illuminated strip at the platen and, hence, to create a varying heat pattern. Further details of the mechanism for accomplishing this displacement are provided below.

At development station C, a magnetic brush development system, indicated generally by the reference numeral 54, advances an insulating development material into contact with the electrostatic latent image. Preferably, magnetic brush development system 54 includes a developer roller 56 within a housing 58. Roller 56 transports a brush of developer material comprising magnetic carrier granules and toner particles into contact with belt 10. Roller 56 is positioned so that the brush of developer material deforms belt 10 in an arc with the belt conforming, at least partially, to the configuration of the developer material. The thickness of the layer of developer material adhering to developer roller 56 is adjustable. The electrostatic latent image attracts the toner particles from the carrier granules forming a toner powder image on photoconductive surface 12.

Continuing with the system description, an output copy sheet 60 taken from a supply tray 62, is moved into contact with the toner powder image at transfer station D. The support material is conveyed to station D by a pair of feed rollers 68, 70. Transfer station D includes a corona generating device 71 which sprays ions onto the backside of sheet 60 thereby attracting the toner powder image from surface 12 to sheet 60. After transfer, the sheet advances to fusing station E where a fusing roller assembly 72 affixes the transferred powder image. After fusing, sheet 60 advances to an output tray (not shown) for subsequent removal by the operator.

After the sheet of support material is separated from belt 10, the residual toner particles and the toner particles of developed test patch areas are removed at cleaning station F.

Subsequent to cleaning, a discharge lamp, not shown, floods surface 12 with light to dissipate any residual charge remaining thereon prior to the charging thereof for the next imaging cycle.

It is believed that the foregoing description is sufficient for purposes of the present application to illustrate the general operation of an electrophotographic printing machine incorporating the main feature of the present invention therein, e. g. the incorporation of a scanning assembly adapted to change from a scanning mode where a fixed document is scanned to one where a moving document is scanned by a periodically-displaced, but otherwise stationary scan/illumination system.

Figure 2:
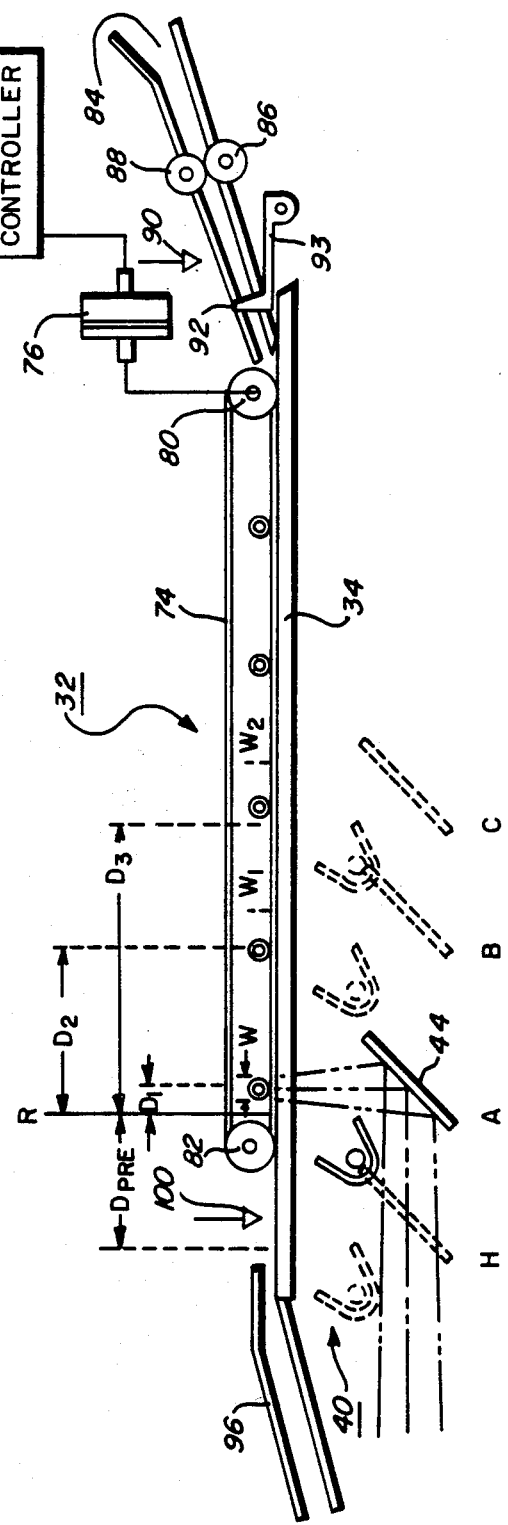
FIG. 2 is a side view of the full rate, half rate scan carriage of FIG. 1 shown in alternate fixed scan positions.

The description thus far has contemplated the positioning of document 30 in a fixed position on platen 34. Document feeder mechanism 32 is a SADH (semi-automatic-document handler) which is designed to either position a document in a registered, fixed position on the platen (for the conventional scanning mode just described) or to stream-feed the documents across the platen in a continuous velocity transport (CVT) mode. U.S. application Ser. No. 678,860 filed on Dec. 6, 1984 now U.S. Pat. No. 4,579,444 and assigned to the same assignee as the present application, describes in detail a combination RDH/SADH document transport system suitable for use herein. The disclosure of this application is herein incorporated by reference. FIG. 2 is an enlarged view of feeder mechanism 32 operating in a CVT mode. Illumination scan assembly 40 is shown in a first scan position A, and in a second and third scan position B, C shown dotted. An operational cycle in the CVT mode will now be described in conjunction with the description of the controller circuitry shown in block diagram form in FIG. 3.

Referring now to FIGS. 1 and 2, document feeder mechanism 32 comprises a platen document transport belt 74 driven in the indicated direction by a servo motor 76. Transport belt 74 is a white, uniformly reflective belt of a conventional high friction material entrained about drive roller 80 and roller 82. The belt 74 provides for feeding of documents without slippage across the surface of the platen. The illustrated detailed backing pressure rollers increase the normal belt-to-platen forces. Documents to be copied are fed into input slot 84 and advanced by input roller pair 86, 88 past a first sensor 90. The document may be temporarily stopped at a "wait" station position 92 before it is transported onto the platen. Position 92 may be enabled by a solenoid activated registration gate 93. Servo motor 76 under the control of system controller 93, drives belt 74, which in turn moves the document, at a rate synchronous with the movement of photoreceptor belt 10.

Upon initiation of the CVT mode, the illumination scan assembly 40 is moved from an off-platen home position H, a distance $D_{pre}$ from a fixed registration point R on the platen to a first, fixed scan park position A. At this position, a distance $D_1$ from registration point R, a longitudinal illumination zone of width W extending over the platen surface is formed. Just prior to movement of the scan assembly to park position A, the document to be copied is released from wait station 92 and fed by rollers 86, 88 until it comes within the nip formed by the platen 34 and drive roller 80. The document is then conveyed across the platen surface and past illumination zone W at a speed synchronous with the photoreceptor movement. The document is thus incrementally illuminated at zone W, projected by optical assembly 36 and exposed at the photoreceptor surface to form a complete latent image on surface 12. The first document proceeds across the platen surface, and, as it loses contact with the belt 74, it is transported into an output tray 96. As it exits the drive area, the lead and trailing edge position is detected by a second sensor 100.

Upon completion of the first document illumination, the illumination assembly 40 is returned to its home (H) position. Upon sensing of a second document placed into slot 84, assembly 40 is moved to a second park position B to the right of park position A and a distance $D_2$ from registration point R. The scan operation is as before except now the illumination zone $W_2$ is offset from the first zone $W_1$. This sequencing, in a preferred embodiment, is repeated a third time with assembly 40 being moved back to home and then to a third park position C a distance $D_3$ from registration position R and forming a third illumination zone $W_2$. It is thus seen that heat buildup along any specific strip of platen glass is minimized by successively changing the illumination strip from document to document. The incremental movement of carriage 45 is controlled by system controller 93 as described below.

Figure 3:
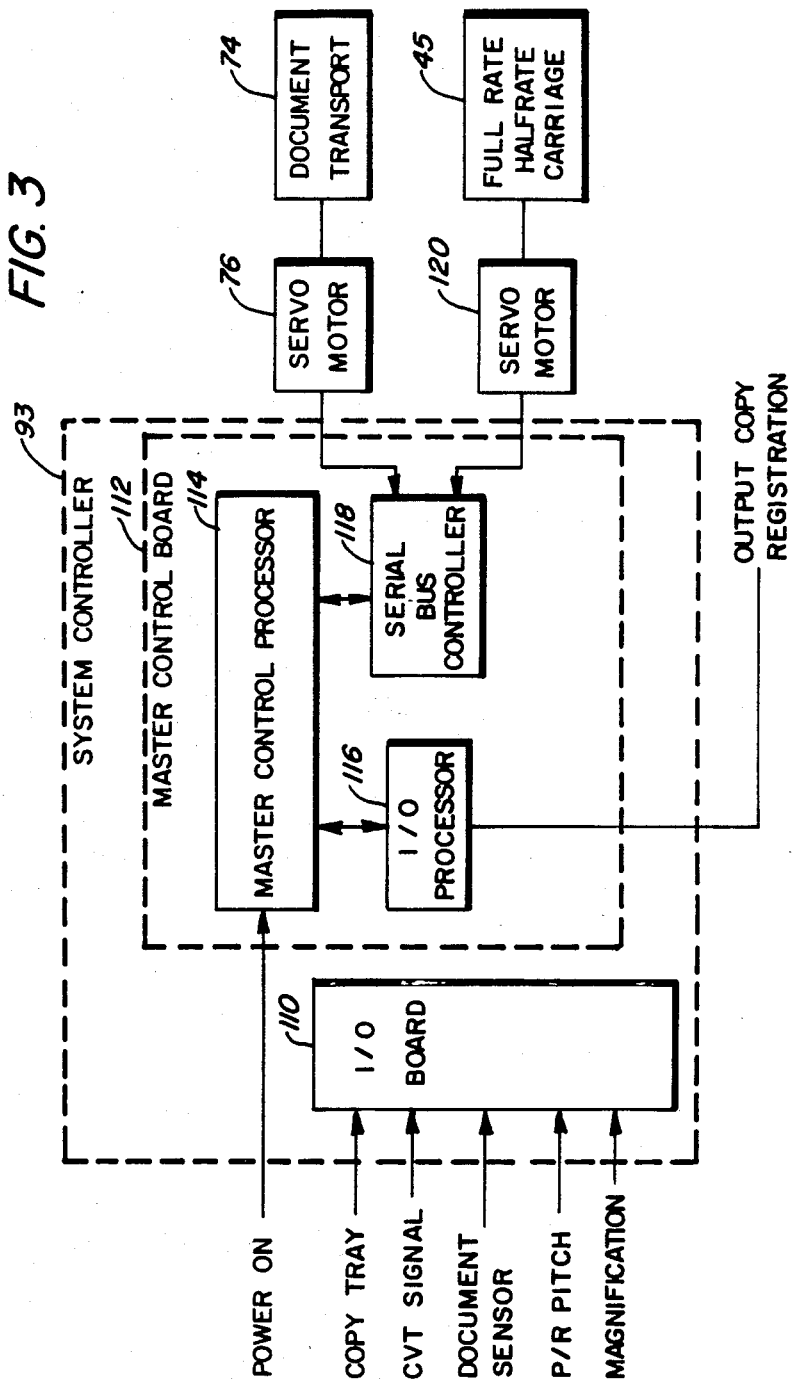
FIG. 3 is a circuit block diagram of the controller functions which control the incremental movements of the scan carriage during a CVT mode of operation.

The CVT mode of operation requires a degree of control by controller 93 based upon inputs supplied by sensors 90, 100 (representing document presence and length position) signals representing belt location (pitch), signals from paper tray 62 and signals indicating a change from a fixed document scan mode of operation to the CVT mode. FIG. 3 is a circuit block diagram showing the control circuit for enabling the CVT mode.

Referring to this Figure, system controller 93 consists of an input/output board 110, and master control board 112 comprising a master control processor 114, input/output processor 116 and serial bus controller 118. Inputs at I/O board 110 include a first signal indicative of the initiation of a CVT mode of operation. This signal can be generated by depressing a switch at the operator control panel or the setting of a switch at document feeder 32. In either case, the document transport device is adjusted to change from a document registered device to a stream-fed device. A second signal to the I/O board is a signal indicative of the photoreceptor pitch. This signal is typically generated by a light sensing mechanism which detects the presence of a seam on the photoreceptor belt or some other encoded mechanism on the belt associated with a photoreceptor belt position. The information contained in this signal is used to ensure proper exposure and registration of the document image within each pitch cycle. In the present embodiment, one image is formed, developed and transferred during each belt revolution but multiple image exposure/reductions are possible within the principles of the invention. A third input to the I/O board is a signal from copy sheet supply tray 62 providing information on copy sheet location and size. A fourth input is signals from first document sensor 90 and 100 indicative of the presence of a document at "wait" position 92 and exit of a document. A fifth input is a signal indicative of the magnification ratio selected for the document to be copied.

The input signals to I/O board 110 are converted and sent to I/O processor 116 and then to master control processor 114. Processor 114 in a preferred embodiment is an Intel Model 8085 programmed to perform the functions associated with incrementally changing the location of the illumination scan assembly and adjusting system timing and registration functions. The scan assembly control signals are first converted by serial bus controller 118 and sent as input signals to servo scan motor 120 which drives full rate scan carriage 45 in a scan or rescan direction. Signals are also sent to servo motor 76 to change the rotational speed of belt 74, and hence of the document feed rate, in response to magnification changes. Output signals are also sent to paper tray 62 via I/O processor 116. These signals adjust the supply timing to ensure proper transfer registration with the developed image.

EXAMPLE

The following data represents operating parameters associated with a CVT mode of operation. Referring to FIG. 2, for a 1:1 magnification and a copy sheet length of 20.28 inches, transport belt 74 is driven at a velocity of 10.5 in/sec synchronous with the photoreceptor velocity. Documents fed through in a continuous stream will result in a throughput of 15 copies/min (one copy for each belt revolution). Referring to FIG. 3, W, $W_1$, $W_2$ = 0.4 inch (1.016 cm)
Dpre = 1.697 inches (4.31 cm)
$D_1$ = 0.803 inch (1.63 cm)
$D_2$ = 1.803 inches (4.57 cm)
$D_3$ = 2.803 inches (7.11 cm)

Figure 4:
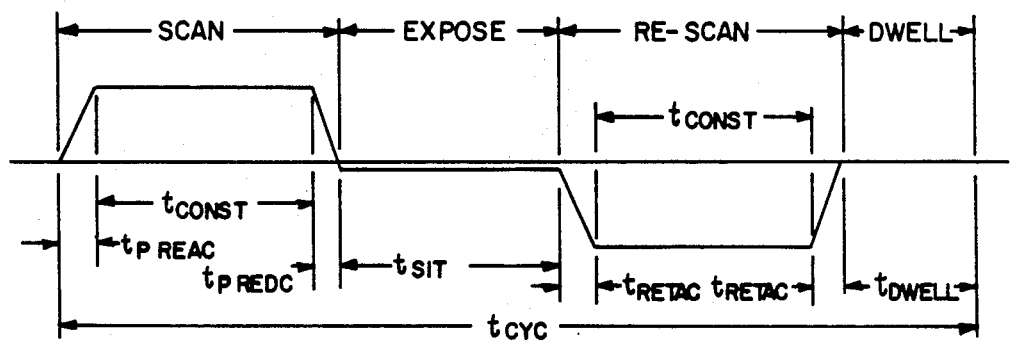
FIG. 4 is a timing diagram of the scan cycle.

FIG. 4 illustrates a timing diagram for the movement of carriage 45. Table 1 summarizes timing data for 3 positions at 1:1 magnification and provides one set of values for $-0.707X$ reduction.

TABLE 1

| Full Rate Timing | | $t_{preac}$ | $t_{const}$ | $t_{sit}$ | $t_{dwell}$ |
|---|---|---|---|---|---|
| Mag | POS | (sec) | (sec) | (sec) | (sec) |
| 1X | 1 | 0.023 | 0.119 | 2.119 | 1.551 |
| 1X | 2 | 0.023 | 0.177 | 2.119 | 1.435 |
| 1X | 3 | 0.023 | 0.234 | 2.119 | 1.321 |
| 707 | 1 | 0.023 | 0.119 | 2.119 | 1.551 |

From the above description, it may be appreciated that there has been described a method and device for avoiding the problems associated with parking a high intensity document illumination lamp at a fixed position to scan illuminate documents being stream-fed past the illumination strip. The incremental displacement of the illumination scan assembly distributes the heat to separate platen locations, thus preventing overheating of one specific area. While the present embodiment has implemented three separate scan/illumination positions, it is within the purview of the invention to accomplish the same goal with a greater or fewer number of positions, dependent on the specific system parameters such as lamp intensity, exposure requirements and platen compositions. For example, it may be possible to use only one scan position corresponding to the first park position. By adjusting the rescan and dwell time of the carriage in the home position, and/or by providing cooling means directed at the home park position sufficient cooling of the exposure strip ($W_1$ for this example) may be obtained to enable the single stop position.

As another example of possible modification, the scan carriage may stay in the same park position for two or more copy runs before moving to a second position. Again, this modification is dependent upon whether the system parameters can tolerate a longer heat buildup at the same strip.

Other changes and modifications may be possible consistent with the principles of the present invention and as embraced in the following claims.

What is claimed is:

1. In an electrophotographic document reproduction apparatus wherein documents in at least one mode of operation are transported across the surface of a transparent support member, an imaging and control system for forming latent images of the moving document, during successive exposure cycles, at a photoreceptor surface, the imaging and control system including:

means for scan/illuminating an incremental strip of said support member, said means held stationary during each said exposure cycle, a lens for projecting reflected images of said incrementally scanned document onto said photoreceptor surface to form a latent image of the document thereon, means for moving said scan/illumination means between a first and at least a second stationary scan position beneath the support member subsequent to at least a first exposure cycle, and control means adapted to control the operation of said scan/illumination means so as to periodically and sequentially move said scan/illumination means between said first and said at least a second position.

2. The document reproduction apparatus of claim 1 wherein one of said scan/illumination positions is located in an area not directly underlying the transparent support member.

3. The document reproduction apparatus of claim 2 wherein said scan/illumination means is sequenced to at least a third position.

4. An improved scanning system for a document reproduction apparatus wherein documents to be copied are, in a first mode of operation, held stationary on a document platen and, during a copying cycle, an optical system is moved beneath the platen to scan/illuminate the document, while in a second mode of operation, the optical system is staionary during an exposure cycle in which the doucments are stream-fed along the platen surface past a scan/illumination zone, the improvement comprising:

drive means adapted to move said optical system to new locations during said second mode thereby effectively changing the location of said scan/illumination zone, and control means adapted to control the operation of said drive means so as to periodically and sequentially cause the drive means to move said optical system to said new locations whereby heat buildup along the scan/illumination zone is reduced.

* * * * *